(12) United States Patent
Bender et al.

(10) Patent No.: US 12,097,670 B2
(45) Date of Patent: Sep. 24, 2024

(54) METHOD AND SYSTEM FOR THREE-DIMENSIONAL PRINTING-BASED CORRECTION OF DEFECTS IN OBJECTS

(71) Applicant: INTERNATIONAL BUSINESS MACHINES CORPORATION, Armonk, NY (US)

(72) Inventors: Michael Bender, Rye Brook, NY (US); Jeremy R. Fox, Georgetown, TX (US); Sarbajit K. Rakshit, Kolkata (IN); Christian Compton, Austin, TX (US); Trisha Elaine Hanlon, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/051,592

(22) Filed: Nov. 1, 2022

(65) Prior Publication Data
US 2024/0140055 A1    May 2, 2024

(51) Int. Cl.
*B29C 73/02* (2006.01)
*B29C 64/205* (2017.01)
(Continued)

(52) U.S. Cl.
CPC ............ *B29C 73/02* (2013.01); *B29C 64/205* (2017.08); *B33Y 10/00* (2014.12); *B33Y 30/00* (2014.12); *B33Y 40/20* (2020.01); *B29C 64/118* (2017.08)

(58) Field of Classification Search
CPC ....... B29C 73/02; B29C 73/025; B29C 73/24; B29C 73/32; B29C 64/205; B29C 64/209; B29C 64/223; B29C 64/106; B29C 64/118
(Continued)

(56) References Cited

U.S. PATENT DOCUMENTS

| 9,688,028 B2 | 6/2017 | Mark et al. |
| 10,639,672 B2 | 5/2020 | Takayama et al. |

(Continued)

FOREIGN PATENT DOCUMENTS

| CN | 105127421 A | 1/2014 |
| CN | 113733609 A | * 12/2021 |

(Continued)

OTHER PUBLICATIONS

Yuen, Michelle C. et al., "Conformable Actuation and Sensing with Robotic Fabric", 2014 IEEE/RSJ International Conference on Intelligent Robots and Systems (IROS 2014) Sep. 14-18, 2014, Chicago, IL, USA, DOI:10.1109/IROS.2014.6942618, published Nov. 6, 2014 (Year: 2014).*

Pearson, Jordan, "New Fabric Could Turn all our Clothes into Robots: That robot looks great on you.", vice.com, published Sep. 24, 2014 <retrieved from the Internet Aug. 30, 2022. https://www.vice.com/en_us/article/z4mq3j/new-fabric-could-turn-all-our-clothes-into-robots, vice.com, published Sep. 24, 2014.

(Continued)

*Primary Examiner* — Seyed Masoud Malekzadeh
*Assistant Examiner* — Vipul Malik
(74) *Attorney, Agent, or Firm* — Kimberly Zillig

(57) ABSTRACT

An apparatus for correcting a defect in an object using three-dimensional (3D) printing. The apparatus includes a flexible wrapper-shaped printing module including an array of port openings adapted to allow a 3D printable material to move therethrough. The flexible wrapper-shaped printing module is configured to wrap around an object to allow the 3D printable material to move through a first set of selected port openings of the array of port openings and be injected into the defect in order to correct the defect.

10 Claims, 6 Drawing Sheets

(51) Int. Cl.
  *B33Y 10/00* (2015.01)
  *B33Y 30/00* (2015.01)
  *B33Y 40/20* (2020.01)
  *B29C 64/118* (2017.01)

(58) Field of Classification Search
  USPC .......................................................... 425/11
  See application file for complete search history.

(56) References Cited

U.S. PATENT DOCUMENTS

| | | | |
|---|---|---|---|
| 10,639,721 B2 | 5/2020 | Das | |
| 11,376,862 B2 | 7/2022 | Przybyla et al. | |
| 11,390,070 B2 | 7/2022 | Ng | |
| 2006/0054039 A1 | 3/2006 | Kritchman et al. | |
| 2013/0059022 A1* | 3/2013 | Kanemasu | B29C 73/10 |
| | | | 425/13 |
| 2016/0067928 A1 | 3/2016 | Mark | |
| 2017/0122481 A1* | 5/2017 | Czaplewski | F16L 55/164 |
| 2017/0240005 A1* | 8/2017 | Kon | B29D 30/0685 |
| 2019/0111637 A1* | 4/2019 | Hanna | B29C 70/549 |

FOREIGN PATENT DOCUMENTS

| | | |
|---|---|---|
| DE | 102012013949 A1 | 1/2014 |
| JP | 11312224 A | 11/1999 |
| KR | 102222079 B1 | 3/2021 |

OTHER PUBLICATIONS

Venere, Emil, "Robotic fabric could bring 'active clothing,' wearable robots", Purdue University: News, New Topics, published Sep. 23, 2014 <retrieved from the Internet Aug. 30, 2022. https://www.purdue.edu/newsroom/releases/2014/Q3/robotic-fabric-could-bring-active-clothing,-wearable-robots.html, Purdue University, published Sep. 23, 2014.

Yuen, Michelle C. et al., "Conformable Actuation and Sensing with Robotic Fabric", 2014 IEEE/RSJ International Conference on Intelligent Robots and Systems (IROS 2014) Sep. 14-18, 2014, Chicago, IL, USA, DOI:10.1109/IROS.2014.6942618, published Nov. 6, 2014 , published Nov. 6, 2014 <retrieved from the Internet Jul. 13, 2022 at 14:00 PM EST>.

\* cited by examiner

500

| Providing a Flexible Wrapper-Shaped Printing Module to a 3D Printer, Wherein the Flexible Wrapper-Shaped Printing Module Includes an Array of Port Openings Adapted to Allow a 3D Printable Material to Move Therethrough | — 510 |

↓

| Wrapping the Flexible Wrapper-Shaped Printing Module Around the Object at a Location Including the Defect | — 520 |

↓

| Supplying the 3D Printable Material to a First Set of Selected Port Openings of the Array of Port Openings in the Flexible Wrapper-Shaped Module | — 530 |

↓

| Printing the 3D Printable Material in the Defect | — 540 |

FIG. 4

METHOD AND SYSTEM FOR THREE-DIMENSIONAL PRINTING-BASED CORRECTION OF DEFECTS IN OBJECTS

BACKGROUND

The present disclosure relates generally to three-dimensional (3D) printing, and more specifically, to a method and system for 3D printing-based correction of defects in objects.

A 3D printing process, also known as additive manufacturing, builds a 3D printed object from a computer-aided design (CAD) model, usually by successfully adding material layer by layer. The layers can each be cured, for example, via exposure to UV light, solidifying them into solid material matching the CAD model.

SUMMARY

According to some embodiments of the disclosure, there is provided an apparatus for correcting a defect in an object using three-dimensional (3D) printing. The apparatus includes a flexible wrapper-shaped printing module including an array of port openings adapted to allow a 3D printable material to move therethrough. The flexible wrapper-shaped printing module is configured to wrap around an object to allow the 3D printable material to move through a first set of selected port openings of the array of port openings and be injected into the defect in order to correct the defect.

According to some embodiments of the disclosure, there is provided a system for correcting a defect in an object using three-dimensional (3D) printing. The system includes a flexible wrapper-shaped printing module including an array of port openings adapted to allow a 3D printable material to move therethrough, wherein the flexible wrapper-shaped printing module is configured to wrap around an object to allow the 3D printable material to move through a first set of selected port openings of the array of port openings and be injected into the defect in order to correct the defect. The system also includes a supply of the 3D printable material connected to the flexible wrapper-shaped printing module. The system further includes a source of suction that is adapted to introduce a backpressure to a second set of selected port openings of the array of port openings.

According to some embodiments of the disclosure, there is provided a method of correcting a defect in an object using three-dimensional (3D) printing. The method includes providing a flexible wrapper-shaped printing module to a 3D printer, wherein the flexible wrapper-shaped printing module includes an array of port openings adapted to allow a 3D printable material to move therethrough. The method also includes wrapping the flexible wrapper-shaped printing module around the object at a location including the defect. The method further includes supplying the 3D printable material to a first set of selected port openings of the array of port openings in the flexible wrapper-shaped module, and printing the 3D printable material in the defect.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

FIG. 4 is a flow diagram illustrating a process of correcting a defect in an object using 3D printing, in accordance with some embodiments.

Figure 1A:
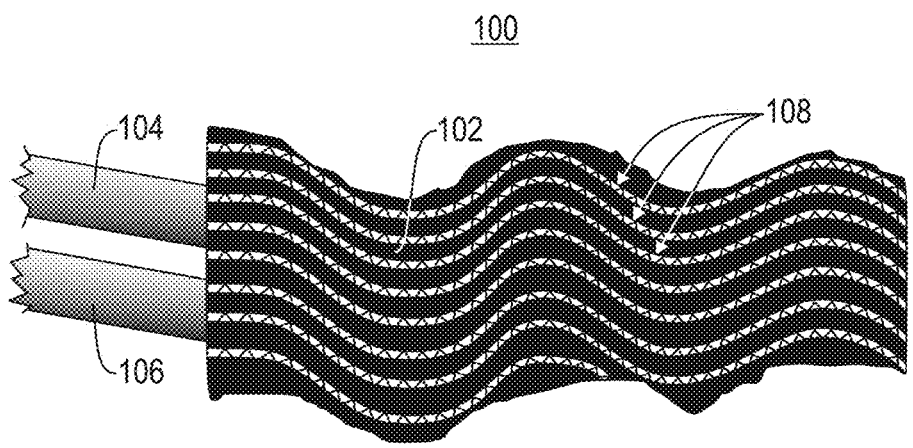
FIG. 1A is a 3D print head, including a flexible wrapper-shaped printing module, in accordance with some embodiments.

While the disclosure is amenable to various modifications and alternative forms, specifics thereof have been shown by way of example in the drawings and will be described in detail. It should be understood, however, that the intention is not to limit the disclosure to the particular embodiments described. On the contrary, the intention is to cover all modifications, equivalents, and alternatives falling within the spirit and scope of the disclosure.

DETAILED DESCRIPTION

Aspects of the present disclosure relate to three-dimensional (3D) printing, and more specifically, to a method and system for 3D printing-based correction of defects in objects.

Disclosed is a method and system by which a 3D print head is a flexible wrapper-shaped printing module that includes an array of opening ports. The opening ports can interchange their role and act as either injection nozzles or suction ports in the flexible wrapper depending upon their location and/or dimension in a printing process. The role (injection, suction or inactivity) of opening ports can be dynamically selected during printing such that printable material can properly be deposited in a crack on an object, for example.

In a 3D printing system, there can be one or more 3D nozzles that are used for printing. A 3D printer reads a computer model and performs the 3D printing. 3D printing is widely being used to print 3D objects from the ground up, but also to augment, rectify or fix existing objects. Broken or damaged objects can include intricate cracks that need repair. Another anomaly that may need correction can be hidden air pockets that are not filled with printed material. The dimension and shape of such cracks or anomalies may be too complex to perform rectification by hand. Even using current 3D printing technology, application of material in a complex crack or anomaly can be difficult, and hence proper correction may not be possible.

Embodiments of the present disclosure can overcome the above, and other problems, by using a 3D print head that includes a flexible, wrapper-shaped printing module, including an array of opening ports. While any rectification is to be performed with 3D printing, the flexible, wrapper-shaped printing module can be wrapped around an area to be corrected and can perform the correction with 3D printing. The flexible wrapper-shaped printing module can be wrapped around a target area, based on a position, a dimension, and a shape of a crack or anomaly in an object. The array of different opening ports can be assigned appropriate roles, such as injection, suction or inactivity. Some ports can be 3D print nozzles to inject 3D printable materials. Some ports can be air suction ports that can suck air and create back pressure. Any remaining ports can be rendered inactive.

Based on a position, a dimension, and a shape of a crack or anomaly, some embodiments of the disclosed system can collaboratively select an appropriate injection pressure of 3D printable material and suction pressure with properly assigned opening ports, such that the material can adequately fill and rectify the crack or anomaly. In some embodiments, the proposed system can dynamically control the flow of the 3D printable material such that a combination of injection pressure and suction pressure can fill the crack correctly without creating a hidden air passage.

In some embodiments, suction ports in the flexible, wrapper-shaped printing module can filter the 3D printable materials. The suction ports can remove a carrier liquid from the flowing 3D printable material, and, accordingly, the 3D printable material will be deposited inside the crack. With an appropriate heating or crystallization method, the 3D printable material can correct the crack.

In some embodiments, the flexible, wrapper-shaped printing module can include a self-controlled wrapping mechanism. A crack area or location can be identified and can be appropriately wrapped so that the crack area is properly covered for 3D printing-based rectification.

An advantage of the disclosed method and system is that objects with complex cracks or other anomalies can be corrected. Another advantage is that the disclosed apparatus can inject a material to correct the defect and can apply suction at the same time, in order to address particular objects with defects.

Figure 1B:
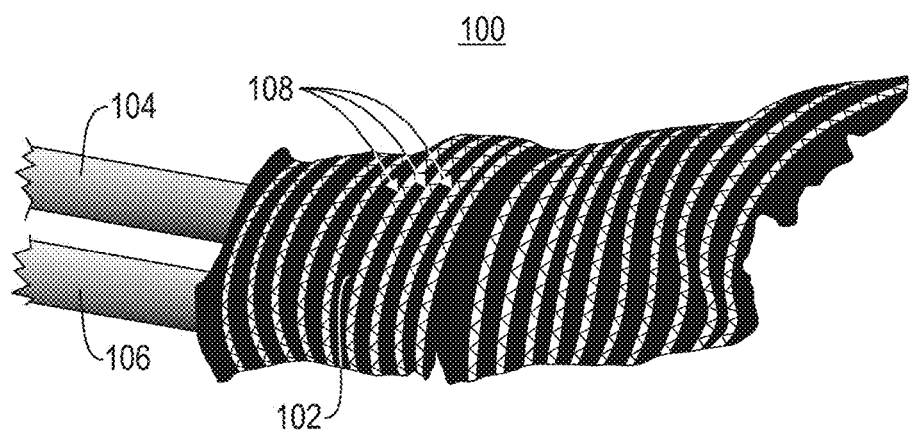
FIG. 1B is the 3D print head of FIG. 1A that is in a wrapped configuration, in accordance with some embodiments.

Turning to FIGS. 1A-1B, a 3D print head 100 is shown, including a flexible wrapper-shaped printing module 102 that is capable of 3D printing, consistent with some embodiments. The flexible wrapper-shaped module 102 can be attached to a supply, or injection hose, 104, for example, which can supply 3D printable material through the 3D print head 100 to the flexible wrapper-shaped printing module 102. The flexible wrapper-shaped module 102 can also be attached to an air suction hose 106, for example, which can remove a carrier fluid, for example, present in the 3D printable material during printing. The flexible wrapper-shaped printing module 102 includes an array of opening ports 108 through which the 3D printable material can be injected, for example. The array of opening ports 108 can include two (2) valves in order for the opening ports to be used for injection or suction depending upon their desired function in a particular repair or correction.

FIG. 1A shows the flexible wrapper-shaped printing module 102 is in a resting or unwrapped configuration. In FIG. 1B, the flexible wrapper-shaped printing module 102 is shown wrapped in one of a plurality of printing configurations that can be chosen to match shape of an object (not shown) that needs correction of a crack, for example. The flexile wrapper-shaped printing module 102 can be wrapped around a target area on an object that is desired to be corrected. The flexible wrapper-shaped printing module 102 can be wrapped around a crack location and can enable injection or suction of 3D printable material for each portion of the array of opening ports 108 such that the crack can be appropriately corrected.

Figure 2A:
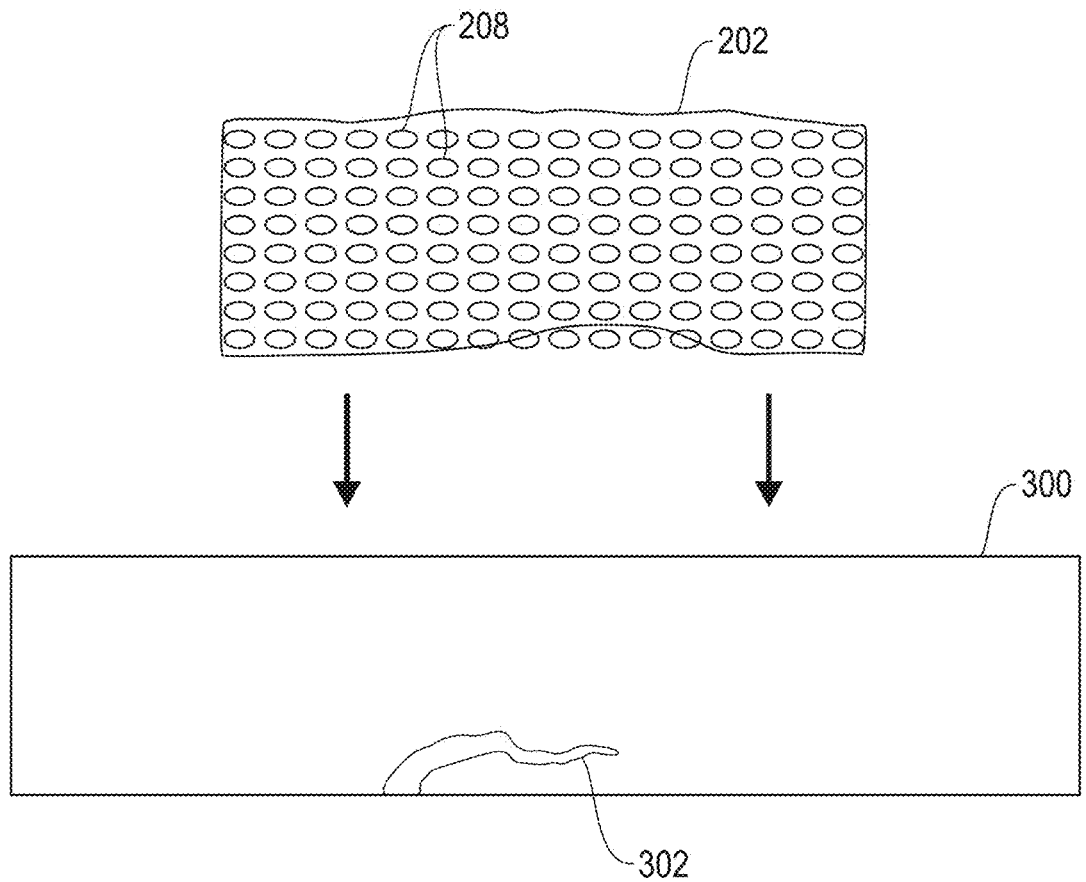
FIG. 2A is a flexible wrapper-shaped printing module separate from an object with a crack to be corrected, in accordance with some embodiments.
Figure 2B:
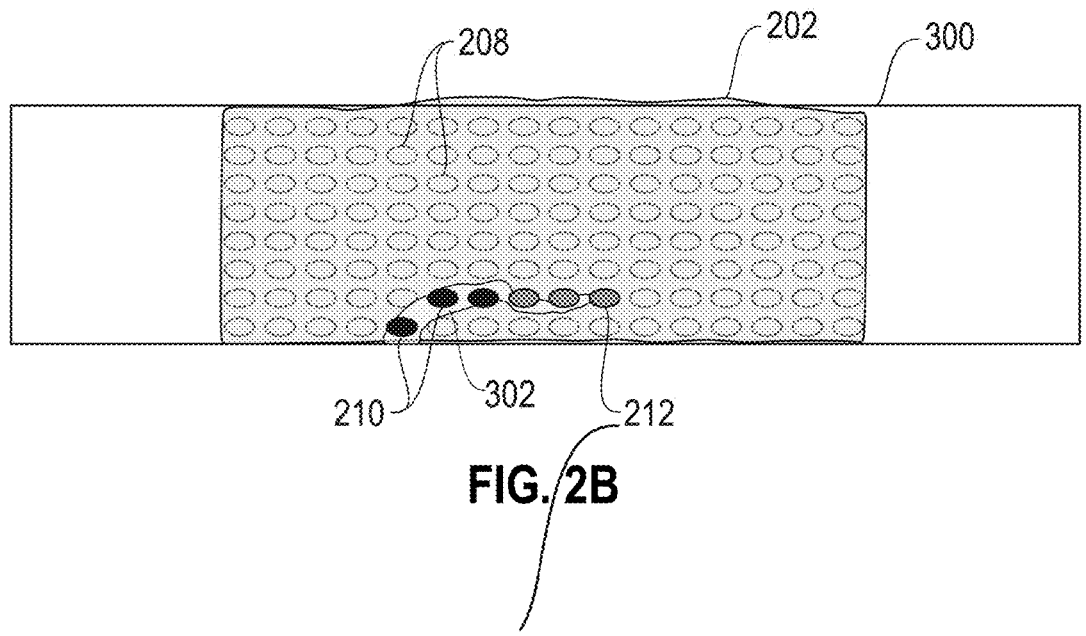
FIG. 2B is the flexible wrapper-shaped printing module of FIG. 2A wrapped around the object in a target area that includes the crack, in accordance with some embodiments.

FIGS. 2A-2B show a flexible wrapper-shaped printing module 202 and an object 300 with a crack 302, consistent with some embodiments. FIG. 2A shows the flexible wrapper-shaped printing module 202, with an array of port openings 208, separate from the object with the crack 302 to be corrected. FIG. 2B shows the flexible wrapper-shaped printing module 202 wrapped around the object 300 in a target area that includes the crack 302. Many port openings 208 of the array of port openings 208 are rendered inactive during a 3D printing process used to correct the crack 302. A plurality of the port openings 208 are converted to 3D printing material injection ports 210, and a plurality of port openings 208 are converted to suction ports 212 to create back pressure and proper flow of the 3D printing material. The combination of using the 3D printing material injection ports 210 and the suction ports 212 are capable of allowing the 3D printable material to flow into and correct the crack 302.

Some embodiments include a system for correcting a defect in an object using three-dimensional (3D) printing. The system can include a flexible wrapper-shaped printing module 102, 202 including an array of port openings 108, 208 adapted to allow a 3D printable material to move therethrough, wherein the flexible wrapper-shaped printing module 102, 202 is configured to wrap around an object to allow the 3D printable material to move through a first set of selected port openings, 3D printing material injection ports 210, of the array of port openings 208 and to inject into the defect in order to correct the defect. The system can also include the supply 104 (or injection) hose of the 3D printable material connected to the flexible wrapper-shaped printing module 102, 202. The system can also include a suction source 106 that is adapted to introduce a backpressure to a second set of selected port openings, suction ports 212, of the array of port openings 208.

Figure 3:
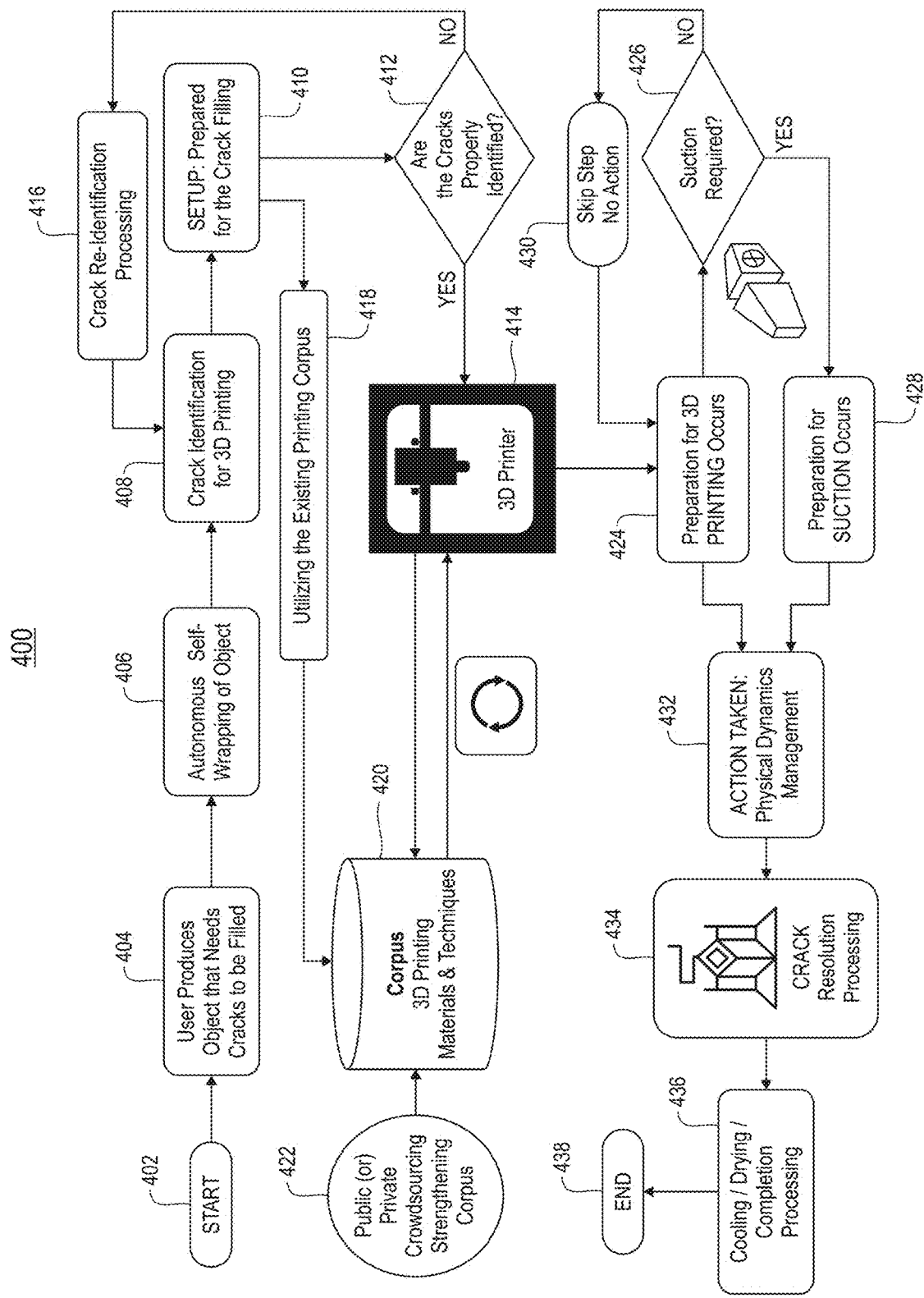
FIG. 3 is a flow diagram illustrating a process of 3D printing to rectify cracks or anomalies in objects, in accordance with some embodiments.

FIG. 3 is a flow diagram illustrating a process 400 of 3D printing to rectify cracks or anomalies in objects, consistent with some embodiments. The process 400 can be performed by a 3D printer, and associated hardware and software. A start block of the process 400 is illustrated by step 402. A user can produce an object that needs a crack to be filled, for example. This is illustrated at step 404. Once the object is produced, a 3D printing head including a flexible wrapper-shaped printing module (such as 102 and 202 in FIGS. 1A-2B) is wrapped around a target area on the object, which includes the crack. This is illustrated at step 406.

In some embodiments, the flexible wrapper-shaped printing module can be made of a robotic fabric. Robotic material can move and contract and is embedded with sensors. For example, the robotic material can be a cotton material containing sensors made of a flexible polymer and threadlike strands of a shape-memory alloy that can return to a coiled shape when heated, causing the fabric to move. The robotic fabric can be wrapped around the object in the process 400 and can autonomously self-wrap the object. Other suitable methods for wrapping and rolling of the flexible wrapper-shaped printing module are also contemplated by the present disclosure.

In the flow diagram of FIG. 3, an illustrated step 408 is identification of the crack in the object. Any suitable crack identification method can be used to determine the appropriate position, dimension, and shape of the crack, for example, such as by eddy current, ultrasound scan, X-ray, etc. Based on the 3D printing corpus (step 420), the geometry, shape, and dimension of the crack can be further identified. The opening passage or space available within the crack can also be identified and can determine a chosen fluidity of the 3D printable material used in the 3D printing.

The 3D printer can be set up and prepared to fill the crack. This is illustrated at step 410. A query is made to determine whether the crack or cracks is/are properly identified, which is illustrated at step 412. If the answer to the query is "yes," then the 3D printer is activated. This is illustrated by advancement to step 414, which represents the 3D printer. If the answer to the query is "no," then the object undergoes a crack re-identification process. This is illustrated at step 416, which leads back to step 408. In addition, the set up step 410 can also utilize an existing 3D printing corpus, which is illustrated by step 418. The 3D printing corpus, illustrated by step 420, can involve using a historical knowledge corpus about the difficulties of 3D printing, for example. Some examples of different difficulties can include post-printing quality validation, such as, for example, presence of an air gap in printing, fluidity of 3D printable material, etc. As illustrated in step 422, public and/or crowdsourcing can strengthen the 3D printing corpus (step 420).

As illustrated in step 424, preparation for 3D printing occurs. During that preparation, a query is made as to whether suction is required during printing. This is illustrated at step 426. If suction is required, then a step 428 of preparation for suction occurs. If suction is not required, then no action is taken, as illustrated by step 430, and further preparation for 3D printing occurs (return to step 424). In some embodiments, a sensor or sensors can be installed within the flexible wrapper-shaped printing module that can be activated or not in certain printing jobs. The sensors can identify the relative position of various opening ports, which are close to the crack location and a determined crack profile. Based on the dimension of the crack or defective area classified above, the appropriate opening ports can be identified which are close to the crack profile. The opening ports that are not close to the crack will not be activated, and the opening ports by the crack will be activated along with 3D printable material injection ports and, possibly, suction ports.

The flexible wrapper-shaped printing module includes an array of opening ports that are valve controlled. The flexible wrapper-shaped printing module can be connected to main suction pump and a 3D printable material injecting pump. Every opening port can have two valves, with one valve to control the printing and the other valve to control suction capabilities. Every opening port can be controlled individually and separately.

As illustrated by step 432, action can be taken in 3D printing, and physical dynamics management can take place. For example, opening ports can be dynamically identified as 3D printable material injection ports, suction ports or inactivated ports. The suction ports can create backpressure such that both the injection ports and suction ports can enable filling of the crack area with the 3D printable material. The physical dynamics management can be adjusted as the printing system determines the status and processing of crack resolution or rectification, which is illustrated by step 434.

After the crack is filled, a completion processing step is performed, which is illustrated as step 436. For example, drying or cooling the material to a final state occurs. The 3D printable material can be solidified based on a defined time of cooling or crystallization. The end of the printing process is illustrated by step 438.

The material used in 3D printers or systems, as described above, typically comprises one or more plastic materials, typically thermoplastics, and particularly acrylonitrile butadiene styrene (ABS). Other thermoplastics which can be used, include nylon, polystyrene and polylactic acid (PLA), for example. Some examples of suitable materials that are contemplated include, for example, ABS filament, polylactic acid (PLA) filament, polyethylene terephthalate (PET) filament, PETT filament, nylon filament, polyvinyl alcohol (PVA) filament, sandstone filament, wood filament, metal filament, high-impact polystyrene (HIPS) filament, magnetic iron filament, conductive filament, carbon fiber filament, thermoplastic elastomer (TPE) filament, glow-in-the-dark filament, and amphora filament.

Although not shown in FIG. 3, chemical injection amelioration management can also be a step in the process 400. For example, the 3D printable material can be dissolved with a carrier liquid. It can flow through the crack, and the suction port can filter the 3D printable material, and the carrier fluid can be removed from the mixture. With appropriate heating, the proposed process can correct the defect.

In FIG. 4, a process 500 of correcting a defect in an object using 3D printing is depicted. The process includes an operation of providing a flexible wrapper-shaped printing module to a 3D printer, wherein the flexible wrapper-shaped printing module includes an array of port openings adapted to allow a 3D printable material to move therethrough. This is illustrated at step 510. Another operation is wrapping the flexible wrapper-shaped printing module around the object at a location including the defect. This is illustrated at step 520. A further operation is supplying the 3D printable material to a first set of selected port openings of the array of port openings in the flexible wrapper-shaped module. This is illustrated at step 530. Yet another operation is printing the 3D printable material in the defect. This is illustrated at step 540.

Additional embodiments of the process 500 can include an operation of identifying the first set of selected port openings from the array of port openings, for example. In addition, the process can include an operation of providing a source of suction connected to the flexible wrapper-shaped printing module configured to introduce a backpressure to a second set of selected port openings of the array of port openings. Another possible operation of the process can be activating the first set of port openings and the second set of port openings together in order to fill the defect with 3D printable material. Further, the process can include an operation of removing at least a portion of the 3D printable material through a second set of selected port openings of the array of port openings using a source of suction connected to the flexible wrapper-shaped printing module that is adapted to remove at least a portion of the 3D printable material through a second set of selected port openings of the array of port openings. In addition, the process can include an operation of cooling the object after printing the 3D printable material in the defect.

Some embodiments of the disclosed processes can be used, for example, in any application where a combination of 3D printing and suction would be useful. One example is a dental application, in which fillings can be added to teeth by 3D printing while simultaneously using suction.

Embodiments of the disclosed apparatus can include multivalve options. For example, there can be multiple valves for multiple, different 3D printable materials to be used during printing.

An embodiment of the disclosure can be a computer enabled system and process to rectify product flaws (e.g., cracks) using 3D printing with a 3D printer. The process can include identifying product flaws on a product, determining a best repair for the product, instructing the 3D printer to repair the product, and determining environmental conditions to let the product sit. The process can further include determining product flaws based on image analysis of the product or manual entry into the system. The process can additionally include identifying a product material from image analysis or entering the material into the system. The process can further include determining a procedure to fix the flaw. This can include determining the size of the flaw. The process can include determining if existing product needs to be vacuumed or blown away. Further the process can include determining materials capable of sticking to the product based on historical analysis using size of flaw, texture, color, and desired durability. The process can further include repairing the product. Additionally, the process can include placing and preparing the product in the 3D printer, receiving instructions to add or remove content from the product, using inks or wrappers to fix the product, and/or setting temperature and time at different points (fix may be multiple steps) based on fix material recommendations and size of repair (using historical data).

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks can be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 5:
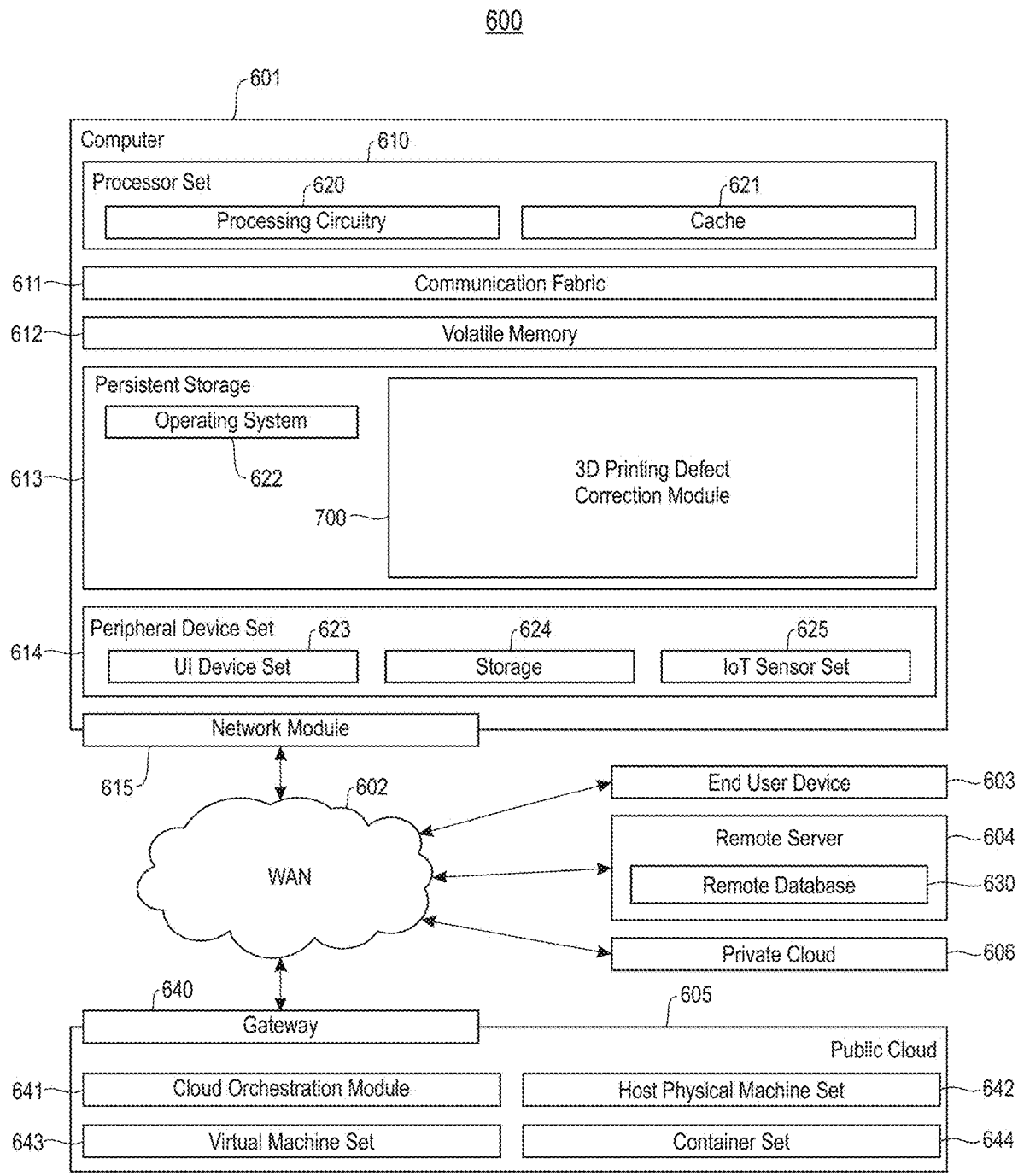
FIG. 5 is a computing environment that contains an example of an environment for the execution of at least some of the computer code involved in performing disclosed methods, in accordance with some embodiments.

As shown in FIG. 5, a computing environment 600 contains an example of an environment for the execution of at least some of the computer code involved in performing disclosed methods, such as a 3D printing defect correction module 700, consistent with some embodiments. In addition to the 3D printing defect correction module 700, computing environment 600 includes, for example, computer 601, wide area network (WAN) 602, end user device (EUD) 603, remote server 604, public cloud 605, and private cloud 606. In this embodiment, computer 601 includes processor set 610 (including processing circuitry 620 and cache 621), communication fabric 611, volatile memory 612, persistent storage 613 (including operating system 622 and block 700, as identified above), peripheral device set 614 (including user interface (UI) device set 623, storage 624, and Internet of Things (IoT) sensor set 625), and network module 615. The EUD 603 can be a 3D printer, for example. Remote server 604 includes remote database 630. Public cloud 605 includes gateway 640, cloud orchestration module 641, host physical machine set 642, virtual machine set 643, and container set 644.

Computer 601 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 630. As is well understood in the art of computer technology, and depending upon the technology, performance of a computer-implemented method may be distributed among multiple computers and/or between multiple locations. On the other hand, in this presentation of computing environment 600, detailed discussion is focused on a single computer, specifically computer 601, to keep the presentation as simple as possible. Computer 601 may be located in a cloud, even though it is not shown in a cloud in FIG. 5. On the other hand, computer 601 is not required to be in a cloud except to any extent as may be affirmatively indicated.

Processor set 610 includes one, or more, computer processors of any type now known or to be developed in the future. Processing circuitry 620 may be distributed over multiple packages, for example, multiple, coordinated integrated circuit chips. Processing circuitry 620 may implement multiple processor threads and/or multiple processor cores. Cache 621 is memory that is located in the processor chip package(s) and is typically used for data or code that should be available for rapid access by the threads or cores running on processor set 610. Cache memories are typically organized into multiple levels depending upon relative proximity to the processing circuitry. Alternatively, some, or all, of the cache for the processor set may be located "off chip." In some computing environments, processor set 610 may be designed for working with qubits and performing quantum computing.

Computer readable program instructions are typically loaded onto computer 601 to cause a series of operational steps to be performed by processor set 610 of computer 601 and thereby effect a computer-implemented method, such that the instructions thus executed will instantiate the methods specified in flowcharts and/or narrative descriptions of computer-implemented methods included in this document (collectively referred to as "the disclosed methods"). These computer readable program instructions are stored in various types of computer readable storage media, such as cache 621 and the other storage media discussed below. The program instructions, and associated data, are accessed by processor set 610 to control and direct performance of the disclosed methods. In computing environment 600, at least some of the instructions for performing the disclosed methods may be stored in block 700 in persistent storage 613.

Communication fabric 611 is the signal conduction path that allows the various components of computer 601 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 612 is any type of volatile memory now known or to be developed in the future. Examples include dynamic type random access memory (RAM) or static type RAM. Typically, volatile memory 612 is characterized by random access, but this is not required unless affirmatively indicated. In computer 101, the volatile memory 612 is located in a single package and is internal to computer 101, but, alternatively or additionally, the volatile memory may be distributed over multiple packages and/or located externally with respect to computer 601.

Persistent storage 613 is any form of non-volatile storage for computers that is now known or to be developed in the future. The non-volatility of this storage means that the stored data is maintained regardless of whether power is being supplied to computer 601 and/or directly to persistent storage 613. Persistent storage 613 may be a read only memory (ROM), but typically at least a portion of the persistent storage allows writing of data, deletion of data and re-writing of data. Some familiar forms of persistent storage include magnetic disks and solid state storage devices. Operating system 622 may take several forms, such as various known proprietary operating systems or open source Portable Operating System Interface-type operating systems that employ a kernel. The code included in block 700 typically includes at least some of the computer code involved in performing the disclosed methods.

Peripheral device set 614 includes the set of peripheral devices of computer 101. Data communication connections between the peripheral devices and the other components of computer 601 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 623 may include components such as a display screen, speaker, microphone, wearable devices (such as goggles and smart watches), keyboard, mouse, printer, touchpad, game controllers, and haptic devices. Storage 624 is external storage, such as an external hard drive, or insertable storage, such as an SD card. Storage 624 may be persistent and/or volatile. In some embodiments, storage 624 may take the form of a quantum computing storage device for storing data in the form of qubits. In embodiments where computer 601 is required to have a large amount of storage (for example, where computer 601 locally stores and manages a large database) then this storage may be provided by peripheral storage devices designed for storing very large amounts of data, such as a storage area network (SAN) that is shared by multiple, geographically distributed computers. IoT sensor set 625 is made up of sensors that can be used in Internet of Things applications. For example, one sensor may be a thermometer and another sensor may be a motion detector.

Network module 615 is the collection of computer software, hardware, and firmware that allows computer 601 to communicate with other computers through WAN 602. Network module 615 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 615 are performed on the same physical hardware device. In other embodiments (for example, embodiments that utilize software-defined networking (SDN)), the control functions and the forwarding functions of network module 615 are performed on physically separate devices, such that the control functions manage several different network hardware devices. Computer readable program instructions for performing the disclosed methods can typically be downloaded to computer 601 from an external computer or external storage device through a network adapter card or network interface included in network module 615.

WAN 602 is any wide area network (for example, the internet) capable of communicating computer data over non-local distances by any technology for communicating computer data, now known or to be developed in the future. In some embodiments, the WAN 602 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 603 is any computer system that is used and controlled by an end user (for example, a customer of an enterprise that operates computer 601), and may take any of the forms discussed above in connection with computer 601. EUD 603 typically receives helpful and useful data from the operations of computer 601. For example, in a hypothetical case where computer 601 is designed to provide a recommendation to an end user, this recommendation would typically be communicated from network module 615 of computer 601 through WAN 602 to EUD 603. In this way, EUD 603 can display, or otherwise present, the recommendation to an end user. In some embodiments, EUD 603 may be a client device, such as thin client, heavy client, mainframe computer, desktop computer and so on.

Remote server 604 is any computer system that serves at least some data and/or functionality to computer 601. Remote server 604 may be controlled and used by the same entity that operates computer 601. Remote server 604 represents the machine(s) that collect and store helpful and useful data for use by other computers, such as computer 601. For example, in a hypothetical case where computer 601 is designed and programmed to provide a recommendation based on historical data, then this historical data may be provided to computer 601 from remote database 630 of remote server 604.

Public cloud 605 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 605 is performed by the computer hardware and/or software of cloud orchestration module 641. The computing resources provided by public cloud 605 are typically implemented by virtual computing environments that run on various computers making up the computers of host physical machine set 642, which is the universe of physical computers in and/or available to public cloud 605. The virtual computing environments (VCEs) typically take the form of virtual machines from virtual machine set 143 and/or containers from container set 644. It is understood that these VCEs may be stored as images and may be transferred among and between the various physical machine hosts, either as images or after instantiation of the VCE. Cloud orchestration module 641 manages the transfer and storage of images, deploys new instantiations of VCEs and manages active instantiations of VCE deployments. Gateway 640 is the collection of computer software, hardware, and firmware that allows public cloud 605 to communicate through WAN 602.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 606 is similar to public cloud 605, except that the computing resources are only available for use by a single enterprise. While private cloud 606 is depicted as being in communication with WAN 602, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 605 and private cloud 606 are both part of a larger hybrid cloud.

Figure 6:
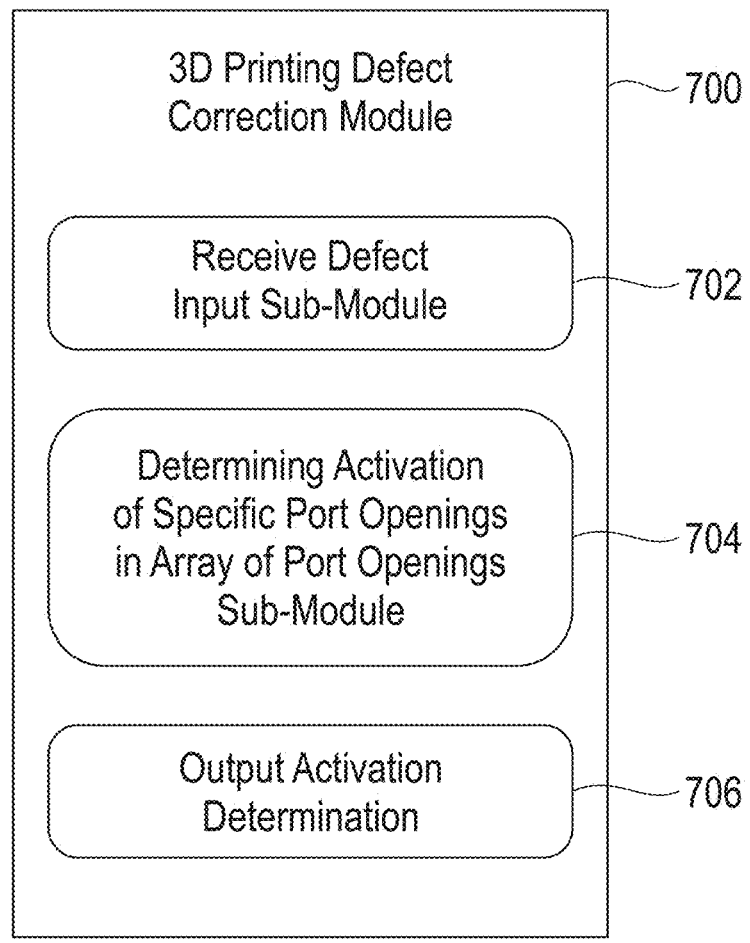
FIG. 6 is a 3D printing defect correction module as in FIG. 5, in accordance with some embodiments.

FIG. 6 is the 3D printing defect correction module 700 of FIG. 5, consistent with some embodiments. As shown, the 3D printing defect correction module 700 can include a sub-module to receive defect input, as illustrated by block 702. Identification of the geometry, shape, dimension and location of a defect in an object can be performed using such techniques as eddy current, ultrasound scan, x-ray, etc. The identification can be performed using sensors in a flexible wrapper-shaped printing module (e.g., see FIGS. 1A-1B), for example. The identification input can be received by the computing environment 600 (see FIG. 5). Based on the identification of the defect, the 3D printing defect correction module 700 can include a sub-module of determining specific port openings in the array of port openings in the flexible wrapper-shaped printing module to be activated in order to 3D print the defect. This is illustrated by block 704. A first set of port openings could be activated to inject 3D printable material, a second set could be activated to provide suction to the target area of the defect, and third set of port openings could be determined to be inactivated during 3D printing. Another sub-module of outputting the activation determination is illustrated by block 706.

For purposes of this description, certain aspects, advantages, and novel features of the embodiments of this disclosure are described herein. The disclosed methods and systems should not be construed as being limiting in any way. Instead, the present disclosure is directed toward all novel and nonobvious features and aspects of the various disclosed embodiments, alone and in various combinations and sub-combinations with one another. The methods and systems are not limited to any specific aspect or feature or combination thereof, nor do the disclosed embodiments require that any one or more specific advantages be present, or problems be solved.

Although the operations of some of the disclosed embodiments are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods. Additionally, the description sometimes uses terms like "provide" or "achieve" to describe the disclosed methods. These terms are high-level abstractions of the actual operations that are performed. The actual operations that correspond to these terms may vary depending on the particular implementation and are readily discernible by one of ordinary skill in the art.

As used in this application and in the claims, the singular forms "a," "an," and "the" include the plural forms unless the context clearly dictates otherwise. Additionally, the term "includes" means "comprises."

"3D printer" is defined as "a machine used for 3D printing" and "3D printing" is defined as "the fabrication of objects through the deposition of a material using a printer (or print) head, nozzle, or another printer technology."

Synonyms associated with and encompassed by 3D printing include additive fabrication, additive processes, additive techniques, additive layer manufacturing, layer manufacturing, and freeform fabrication. "Additive manufacturing (AM)" is defined as "a process of joining materials to make objects from 3D model data, usually layer upon layer, as opposed to subtractive manufacturing methodologies. Additive manufacturing (AM) may also be referred to as rapid prototyping (RP). As used herein, "3D printing" is generally interchangeable with "additive manufacturing" and vice versa.

"Printing" is defined as depositing of a material using a print head, nozzle, or another printer technology.

In this disclosure, "3D or three dimensional article, object or part" means an article, object or part obtained by additive manufacturing or 3D printing as disclosed above.

In this disclosure, the term "3D printing" covers a variety of processes in which material is joined or solidified under computer control to create a 3D object. Material is added together (such as liquid molecules or powder grains being fused together) typically layer by layer.

In general, all 3D printing processes have a common starting point, which is a computer generated data source or program which may describe an object. The computer generated data source or program can be based on an actual or virtual object. For example, an actual object can be scanned using a 3D scanner and scan data can be used to make the computer generated data source or program. Alternatively, the computer generated data source or program may be designed from scratch.

The computer generated data source or program is typically converted into a standard tessellation language (STL) file format; however other file formats can also or additionally be used. The file is generally read into 3D printing software, which takes the file and optionally user input to separate it into hundreds, thousands, or even millions of "slices." The 3D printing software typically outputs machine instructions, which may be in the form of G-code, which is read by the 3D printer to build each slice. The machine instructions are transferred to the 3D printer, which then builds the object, layer by layer, based on this slice information in the form of machine instructions. Thicknesses of these slices may vary.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. An apparatus for correcting a defect in an object using three-dimensional (3D) printing, the apparatus comprising:
    a flexible wrapper-shaped printing module including an array of port openings adapted to allow a 3D printable material to move therethrough, wherein a port opening of the array of port openings includes a first valve adapted for injection of the 3D printable material and a second valve adapted for suction; and
    at least one 3D print nozzle,
    wherein the flexible wrapper-shaped printing module is configured to wrap around a target area including the defect in the object to allow the 3D printable material to move from the at least one 3D print nozzle through a first set of selected port openings of the array of port openings and be injected into the defect in order to correct the defect.

2. The apparatus of claim 1, further comprising:
    an injection hose connected to the flexible wrapper-shaped printing module that is adapted to supply the 3D printable material through the first set of selected port openings.

3. The apparatus of claim 1, further comprising:
    a suction hose connected to the flexible wrapper-shaped printing module adapted to introduce a backpressure to a second set of selected port openings of the array of port openings.

4. The apparatus of claim 3, wherein the suction hose is adapted to remove at least a portion of the 3D printable material through the second set of selected port openings of the array of port openings.

5. The apparatus of claim 4, wherein the portion of the 3D printable material is a carrier fluid.

6. The apparatus of claim 1, wherein the flexible wrapper-shaped printing module includes a robotic cloth adapted to autonomously wrap around the object.

7. A system for correcting a defect in an object using three-dimensional (3D) printing, the system comprising:
    at least one 3D print nozzle;
    a flexible wrapper-shaped printing module including an array of port openings adapted to allow a 3D printable material to move therethrough, wherein a port opening of the array of port openings includes a first valve adapted for injection of the 3D printable material and a second valve adapted for suction, and the flexible wrapper-shaped printing module is configured to wrap around a target area including the defect in the object to allow the 3D printable material to move from the at least one 3D print nozzle through a first set of selected port openings of the array of port openings and be injected into the defect in order to correct the defect;
    a supply of the 3D printable material connected to the flexible wrapper-shaped printing module; and
    a source of suction hose connected to the flexible wrapper-shaped printing module that is adapted to introduce a backpressure to a second set of selected port openings of the array of port openings.

8. The system of claim 7, wherein the flexible wrapper-shaped printing module includes a robotic cloth adapted to autonomously wrap around the object.

9. The system of claim 7, wherein the source of suction hose is adapted to remove at least a portion of the 3D printable material through the second set of selected port openings of the array of port openings.

10. The system of claim 9, wherein the portion of the 3D printable material is a carrier fluid.

* * * * *